United States Patent [19]

Kazama et al.

[11] Patent Number: 5,764,022
[45] Date of Patent: Jun. 9, 1998

[54] AIR CONDITIONER AND INVERTER DRIVING CIRCUIT THEREFOR

[75] Inventors: Akihiro Kazama; Yoshio Kikuiri; Eiji Oohashi, all of Ooizumimachi, Japan

[73] Assignee: Sanyo Electric Co., Ltd., Oosaka-fu, Japan

[21] Appl. No.: 754,514

[22] Filed: Nov. 21, 1996

Related U.S. Application Data

[63] Continuation of Ser. No. 352,239, Dec. 8, 1994, abandoned.

[30] Foreign Application Priority Data

Dec. 28, 1993 [JP] Japan ............................. 5-336627
Jan. 12, 1994 [JP] Japan ............................. 6-001688

[51] Int. Cl.⁶ ............................................. H02P 5/34
[52] U.S. Cl. .................. 318/801; 318/807; 363/37; 363/40
[58] Field of Search ........................ 318/798–801; 363/34–48

[56] References Cited

U.S. PATENT DOCUMENTS

| | | | |
|---|---|---|---|
| 4,682,094 | 7/1987 | Kuroiwa | 318/722 X |
| 4,849,950 | 7/1989 | Sugiura et al. | 363/48 |
| 4,879,639 | 11/1989 | Tsukahara | 318/803 X |
| 4,894,763 | 1/1990 | Ngo | 318/803 X |
| 5,047,909 | 9/1991 | Hosoda | 318/806 X |
| 5,146,148 | 9/1992 | Voet | 318/803 X |
| 5,206,575 | 4/1993 | Nakamura et al. | 318/807 X |

FOREIGN PATENT DOCUMENTS 0 521 467 A2  1/1993  European Pat. Off. .

OTHER PUBLICATIONS

Patent Abstracts of Japan, Publication No. 05300757, Published Nov. 12, 1993.
Patent Abstracts of Japan, Publication No. 04079773, Published Mar. 13, 1992.
European Search Report.

*Primary Examiner*—David S. Martin
*Attorney, Agent, or Firm*—Darby & Darby

[57] ABSTRACT

In an inverter driving circuit and an air conditioner having the same, the circuit elements constituting the inverter driving circuit are arranged and connected through wirings along a power supply path so that those circuit elements and wirings which are located at the front stage of a noise filter are spatially separated from those circuit elements and wirings which are located at the rear stage of the noise filter. A power source of a controller for the inverter driving circuit is supplied with an alternating power from a neutral point and one of three phases (R.S.T) of the noise filter, and a high-frequency noise occurring in a transistor module is intercepted by a smoothing circuit and a rectifying circuit, so that the noise contamination into the controller can be prevented. The voltage to be supplied to the controller may be a low voltage.

2 Claims, 6 Drawing Sheets

AIR CONDITIONER AND INVERTER DRIVING CIRCUIT THEREFOR

This is a of continuation of application Ser. No. 08/352, 239, filed Dec. 8, 1994 abandoned.

BACKGROUND OF THE INVENTION

1. Field of the Invention

This invention relates to a variable frequency control type of air conditioner using an inverter power source, and particularly to the improvement of a mount technique for parts of an inverter driving circuit which is mounted in an electrical-equipment box built in an air conditioner and the improvement of a power source for a controller for an inverter driving circuit.

2. Description of the Related Art

In general, an outdoor unit of an air conditioner contains therein equipments such as a heat exchanger, a compressor, an accumulator, etc. and an electrical-equipment box for electrical equipments for driving the above equipments.

FIGS. 3 and 4 show an outdoor unit 1 with a back panel thereof being detached, where FIG. 3 is a perspective view of the outdoor unit 1 when an inner panel is further detached and FIG. 4 is a front view of the outdoor unit 1 which is viewed from the back side thereof. As shown in FIGS. 3 and 4, the outdoor unit 1 of the air conditioner includes a housing 2, a first compressor 3 for a constant speed driving operation, a second compressor 10 for an inverter driving operation, an accumulator 4 and a receiver tank (not shown), etc. which are accommodated in the housing 2. The outdoor unit 1 further includes an electrical-equipment box 8 which is accommodated at the upper space of the inside of the housing 2 so as to be filled in the space in the width direction of the housing. A heat exchanger is further disposed at the back side of the outdoor unit 1, and air is ventilated to the heat exchanger through an air suction port 11 at the side surface of the housing 2 by a pair of fans 5a and 5b.

These equipments are disposed in the housing 2 while partitioned into a group of equipments having high heating value and a group of equipments having low heating value. Those equipments which have a relatively high heating value are disposed at a first space 6 at the left side of FIG. 4 (at a side portion beneath the electrical-equipment box 8) while those equipments which have a relatively low heating value are disposed at a second space 7 at the right side (at the other side portion beneath the electrical-equipment box 8).

That is, in the first space 6 are disposed the first and second compressors 3 and 10 which have the relatively higher heating value in the equipments of a refrigeration circuit, and equipments appendant to the compressors. In the electrical-equipment box 8 are disposed an inverter driving circuit for driving the compressors, the other equipments of the outdoor unit and control circuits.

FIG. 5 is a block diagram showing an electrical circuit of the inverter driving circuit. In FIG. 5, alternating power is supplied from a three-phase power source 12 is supplied through a terminal board to the inverter driving circuit in the electrical-equipment box 8. The terminal board 13 is connected to a noise filter 14. The noise filter 14 serves to remove a noise N1 (impulse noise or the like) which invades from the three-phase power source 12 side to a converter portion of the circuit, and an LC integration type filter or the like may be used as the noise filter 14. The output of the noise filter 14 is supplied through a magnet switch 15 to a bridge diode 16.

The bridge diode 16 is a bridge-connection type of full-wave rectifier, and serves to rectify the three-phase alternating power to DC power. The DC output of the bridge diode 16 is smoothed by a smoothing circuit comprising a noise filter 17, a reactor 18 and a capacitor 19, and then supplied to a transistor module 21. The noise filter 17 serves to prevent a high-frequency switching noise N2 produced in the transistor module 21 from invading into the converter portion 22. On the basis of the supplied DC power, the transistor module 21 drives the second compressor 10 under control of a controller 20, for example, under the variable frequency control based on PWM (pulse width modulation) control.

As described above, the inverter driving circuit comprises many circuit elements (parts). These circuit elements have been conventionally laid out in consideration of facility of fabrication, draw-out of wirings, management of heat, etc. However, the conventional circuit arrangement has been considered mainly in terms of productivity such as facility of fabrication, etc., so that attention is little paid to a countermeasure to electrical characteristics, particularly noises.

Specifically, irrespective of insertion of the noise filter 14 and the noise filter 17 in the circuit to remove the noises, in some cases the circuit arrangement is made such that the wirings of the three-phase power source 12 and the wirings in the converter portion 22 approach to each other or cross each other, or the wirings of the inverter portion 23 and the wirings of the converter portion 22 approach to each other or cross each other. Therefore, in some cases the noise filters 14 and 17 do not effectively work.

On the other hand, in a variable frequency control type of air conditioner using an inverter driving circuit, a driving power-source frequency is varied in accordance with an air conditioning load, in a frequency range of 15 to 75 Hz for example, to adjust a compression power (capacity) of the compressor. The variable control of the driving power-source frequency is performed by a controller (CPU) which is built in the electrical-equipment box 8 (FIG. 4) of the air conditioner.

FIG. 6 shows the conventional inverter driving circuit and the controller. In FIG. 6, three-phase alternating power (R-phase, S-phase, T-phase) which is supplied from a three-phase four-wire type of alternating power source 31 having a neutral point N is input to a noise filter 32. The noise filter 32 comprises an LC integration type of noise filter containing a reactor and capacitor, and serves to remove noises (particularly high-frequency noises) contained in the power supplied from the three-phase alternating power source 31 to the noise-removed alternating power to a rectifier (rectifying circuit) 33. The rectifier 33 comprises a three-phase bridge rectifying circuit having diodes, and serves to convert the supplied alternating power to DC power. The DC power thus obtained is input to a smoothing circuit comprising a reactor 34 and a smoothing capacitor 35 to remove ripple components, and then supplied to a transistor module 36. On the basis of the supplied DC power, the transistor module 36 generates alternating power having a desired frequency using PWM control in accordance with a control signal which is supplied from the controller 38 through a control signal line 40, thereby driving a compressor motor of the compressor 7. The other equipments are represented by reference numeral 41.

In order to simplify the construction of the inverter driving circuit as described above, a power source for the controller is designed to commonly use the DC power produced in the inverter driving circuit, and thus the DC power is drawn in from the output stage of the smoothing circuit (reactor 34, smoothing capacitor 35) through a power source wiring 39.

The conventional inverter driving circuit as described above has an advantage that the circuit construction can be simplified because of the common use of the power source.

However, in this circuit, the DC power is directly supplied from the input stage of the transistor module (the output stage of the reactor 34, the smoothing capacitor 35) to the controller 38, so that a switching noise emitted from the transistor module 36, that is, a high-frequency noise of PWM wave is contaminated through the power source wiring 39 into the controller 38 to adversely affect the operation of the controller 38.

Further, the three-phase four-wiring type of alternating power source is actuated at a relatively high voltage (for example, AC380V), and the input voltage of the transistor module 36 is set to a high voltage (for example, DC537V). Therefore, a transformer which is designed to have high resistance to voltage must be used for a switching regulator of a power source portion built in the controller 38, and it must be designed in large size in consideration of insulation. That is, restriction is imposed on miniaturization of the device.

SUMMARY OF THE INVENTION

An object of the present invention is to provide a circuit wiring arrangement for an inverter driving circuit with which a noise filter can effectively work and noise contamination can be suppressed.

Another object of the present invention is to provide an air conditioner in which noise contamination from a transistor module can be suppressed and a power source for a controller can be miniaturized.

In order to attain the above objects, according to a first aspect of the present invention, an inverter driving circuit for an air conditioner in which a noise filter for removing at least noises from an alternating power source side is inserted, is characterized in that circuit elements constituting the inverter driving circuit are disposed along a power supply path extending from the alternating power source side to the output terminal of the inverter driving circuit while wirings thereof are connected to one another, and those circuit elements and wirings which are located at the front stage of the noise filter are disposed away from those circuit elements and wirings which are located at the rear stage of the noise filter, that is, the circuit elements before and after the noise filter are arranged so as to be spatially separated from each other with respect to the noise filter (hereinafter referred to as "spatial separation arrangement").

According to a second aspect of the present invention, the inverter driving circuit as described above further includes a second noise filter for removing noises invading from an inverter portion to a converter portion, and the circuit elements and wirings for the inverter portion are disposed away from the circuit elements and wirings for the converter portion (i.e., these circuit elements are arranged spatially separately from each other).

That is, this inverter driving circuit is designed in consideration of removal of other noises.

According to a third aspect of the present invention, in the inverter driving circuit of the first or second aspect of the present invention, electrical parts other than those of the inverter driving circuit are disposed between the circuit elements which constitute the inverter driving circuit and are disposed away from each other.

According to a fourth aspect of the present invention, an air conditioner having a noise filter for removing noise components contained in power supplied from a three-phase fourwire type of alternating power source, a rectifying circuit for converting the supplied alternating power to DC power through the noise filter, a transistor module for generating and outputting variable-frequency alternating power for a compressor driving operation on the basis of the DC power from the rectifying circuit, and a controller for supplying the transistor module with a control signal for a variable frequency driving operation, is characterized in that the controller has a power source unit which is supplied with power through a power-source wiring connected across a neutral point and one of three phases of the three-phase four-wire type of alternating power source at the output terminal of the noise filter.

According to the first aspect of the present invention, a noise-existing portion at the front side of the noise filter and a noise-removed portion at the rear side of the noise filter are disposed so that they do not approach to each other or do not cross each other, and thus the noise filter can effectively work. Further, the circuit elements are disposed along the power supply path, so that noise contamination can be prevented with short wirings.

According to the second aspect of the present invention, the noise contamination can be also prevented between the inverter portion and the converter portion.

According to the third aspect of the present invention, the space in which the respective circuit elements are disposed away from each other (i.e., the spatially-separating space for the circuit elements) can be effectively used, and assurance of the spatial separation arrangement can be improved.

According to the fourth aspect of the present invention, the power source of the controller is supplied with the alternating power from the neutral point of the noise filter and any one phase (R, S or T) of the noise filter, and the high-frequency noise occurring in the transistor module can be intercepted by a smoothing circuit and a rectifying circuit, so that the noise contamination into the controller can be prevented.

Further, the alternating power supplied to the controller is a voltage applied across the neutral point and any one phase of the noise filter, and thus it may be a low voltage unlike a voltage based on a high line voltage of the prior art, so that the voltage resistance of a transformer of a switching regulator can be more reduced and the transformer can be miniaturized.

DETAILED DESCRIPTION OF PREFERRED EMBODIMENTS

Preferred embodiments according to the present invention will be described hereunder with reference to the accompanying drawings.

Figure 1:
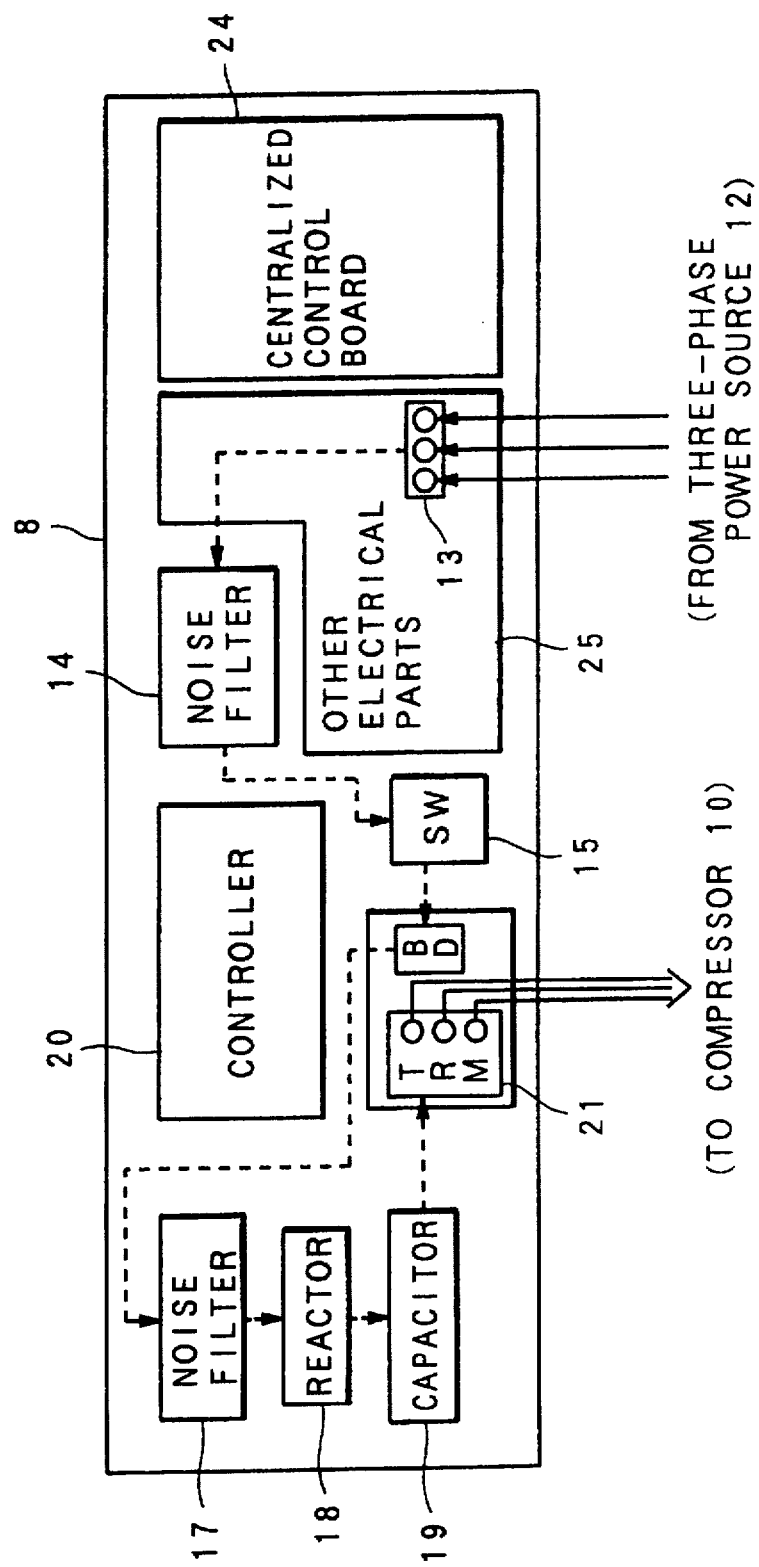
FIG. 1 is a block diagram showing a first embodiment of an inverter driving circuit according to the present invention.
Figure 5:
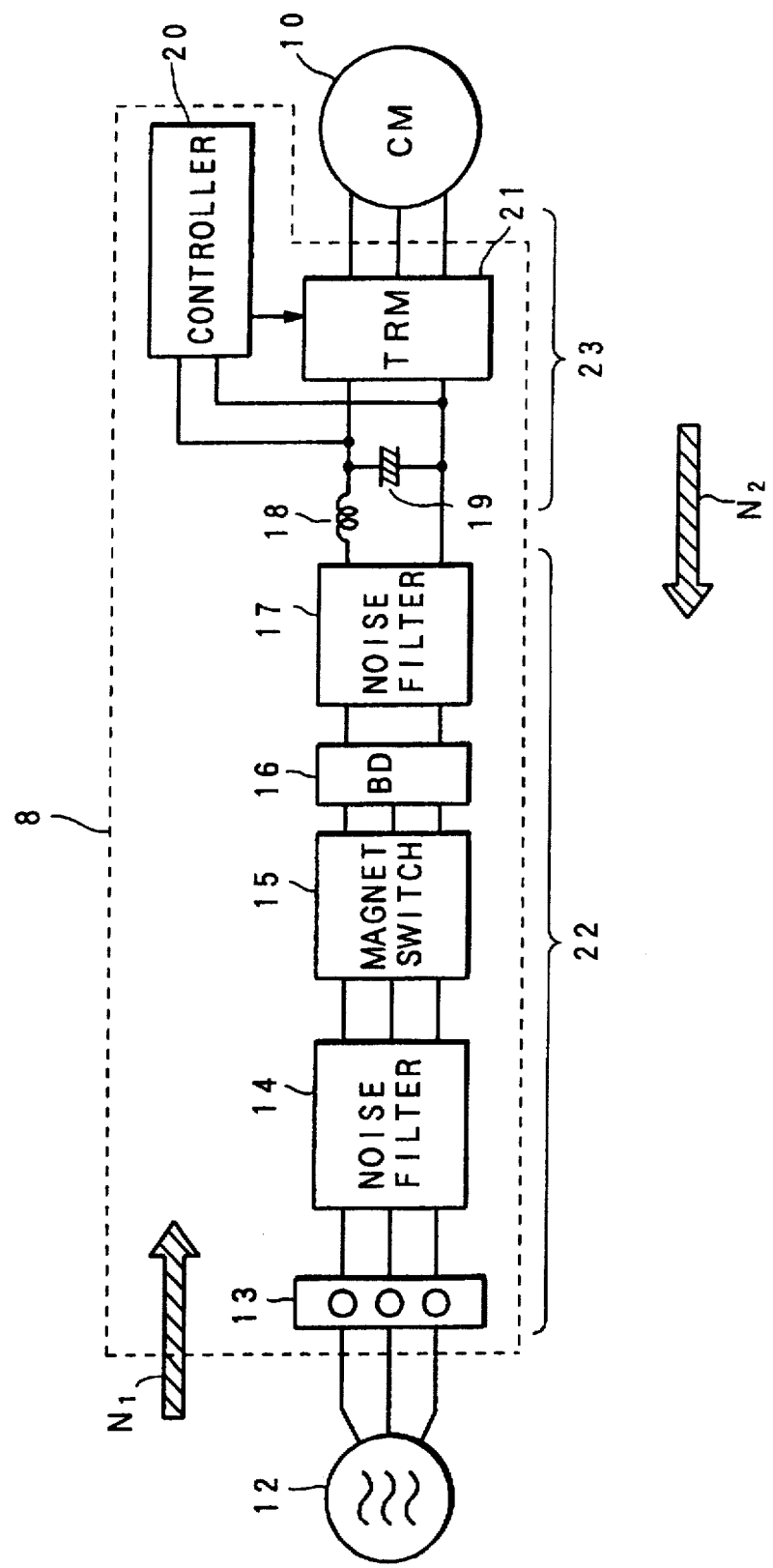
FIG. 5 is a block circuit diagram showing an electrical circuit of a conventional inverter driving circuit.

FIG. 1 shows a first embodiment of the inverter driving circuit of the invention. The electrical circuit of the inventer driving circuit is similar to that of FIG. 5, and the detailed description thereof is omitted.

As shown in FIG. 1, the circuit elements of the inverter driving circuit are arranged along a power supply path through which three-phase alternating power flows from the three-phase power source 12 to the output stage of the transistor module 21 so that the wirings between the respective circuit elements are disposed away from one another (spatially separately arranged) without approaching to each other or crossing each other.

Specifically, the terminal board 13 is disposed at one side portion of the electrical-equipment box 8, and the noise filter 14 is disposed to the other side portion of the electrical-equipment box 8, which is opposite to the one side portion at which the terminal board 13 is disposed. As seen in FIG. 1, the electrical-equipment box 8 has four sides, with a first side and a second side being spaced from one another along a first axis and a third side and a fourth side being spaced from one another along a second axis. The terminal board 13 and the noise filter 14 may be disposed along either the first and second sides or the third and fourth sides. Further, the magnet switch 15 is disposed at the same side portion as the terminal board 13, however, away from the terminal board 13 as shown in Fig. 1. That is, the circuit elements are arranged in a zigzag from as a whole.

According to this spatially-separated arrangement, a noise-existing area containing those circuit elements which may potentially produce noises and a noise-removed area which is external of the noise-containing areas; containing those circuit elements from which the noises are removed are arranged not to be contaminated with each other with the noise filters 14 and 17 at the boundary. Therefore, the noise filters 14 and 17 can be effectively used, and their original function can effectively work.

On the other hand, other electrical parts which are not directly associated with the inverter driving circuit, such as a centralized control board 24, other electrical equipments 25, the controller 20, etc. are arranged to be interposed between the respective circuit elements constituting the inverter driving circuit.

The lay-out pattern of the circuit elements of the inverter driving circuit is not limited to the above embodiment, and the size or shape of the circuit elements are determined in accordance with the size or shape of the other electrical equipments 25, the centralized control board 24 and the controller 20. That is, various modifications may be suitably made to the above embodiment without departing from the subject matter of the present invention.

According to the above embodiment, the noise filters can be effectively used to prevent the operation of the device from being unstable due to noise contamination, and improve its reliability.

Figure 2:
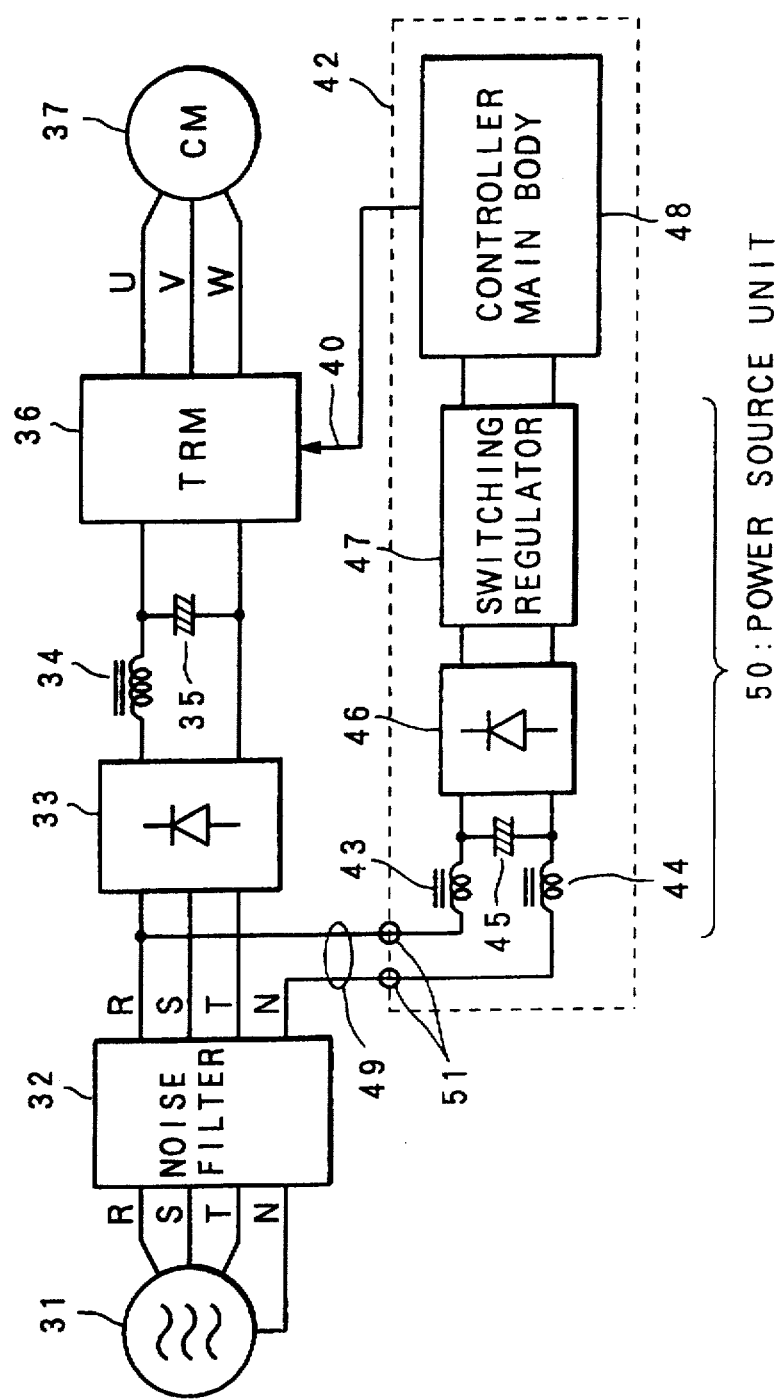
FIG. 2 is a block diagram showing a second embodiment of the inverter driving circuit and a power source for a controller according to the present invention.
Figure 3:
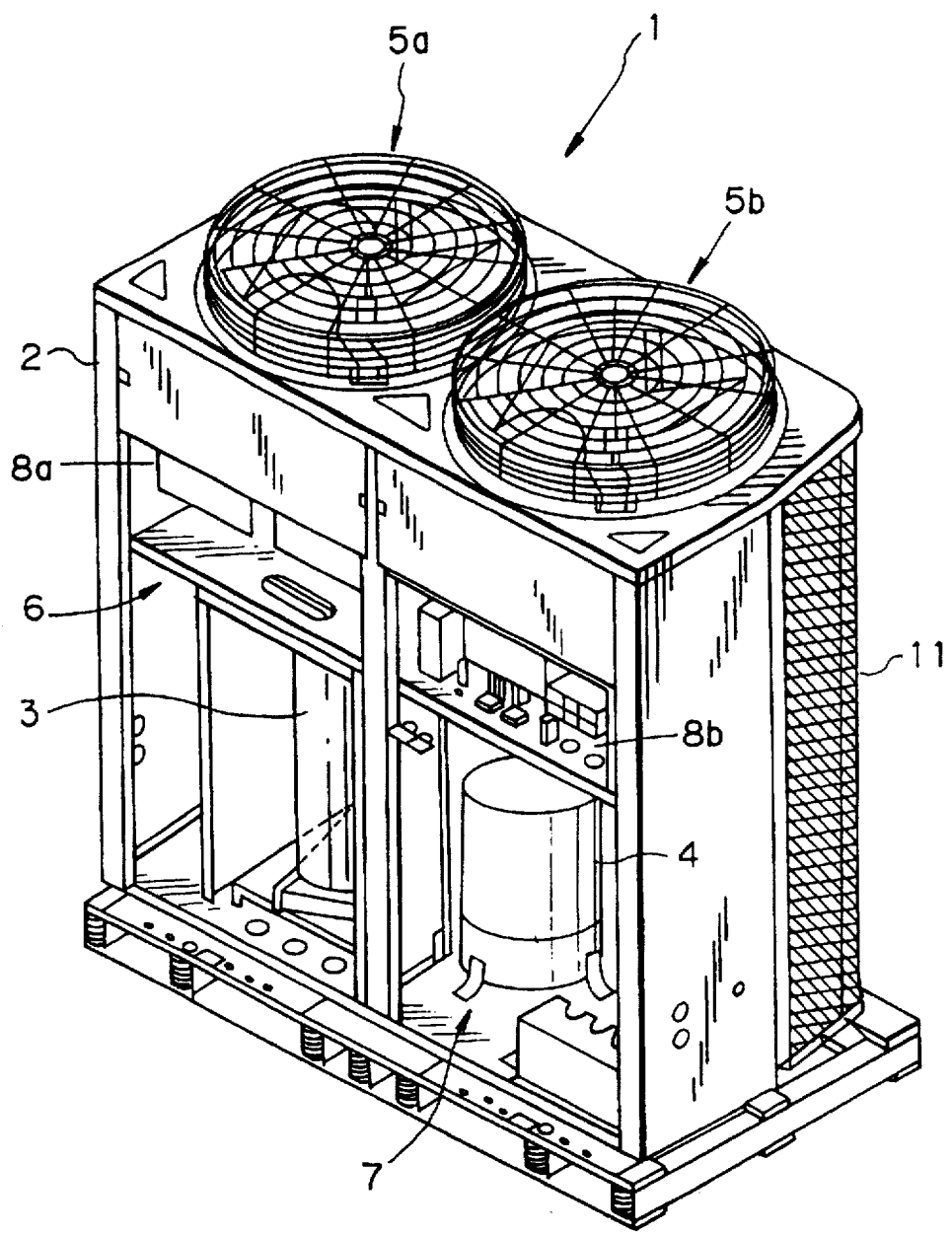
FIG. 3 is a perspective view showing the inside a conventional outdoor unit of an air conditioner.
Figure 4:
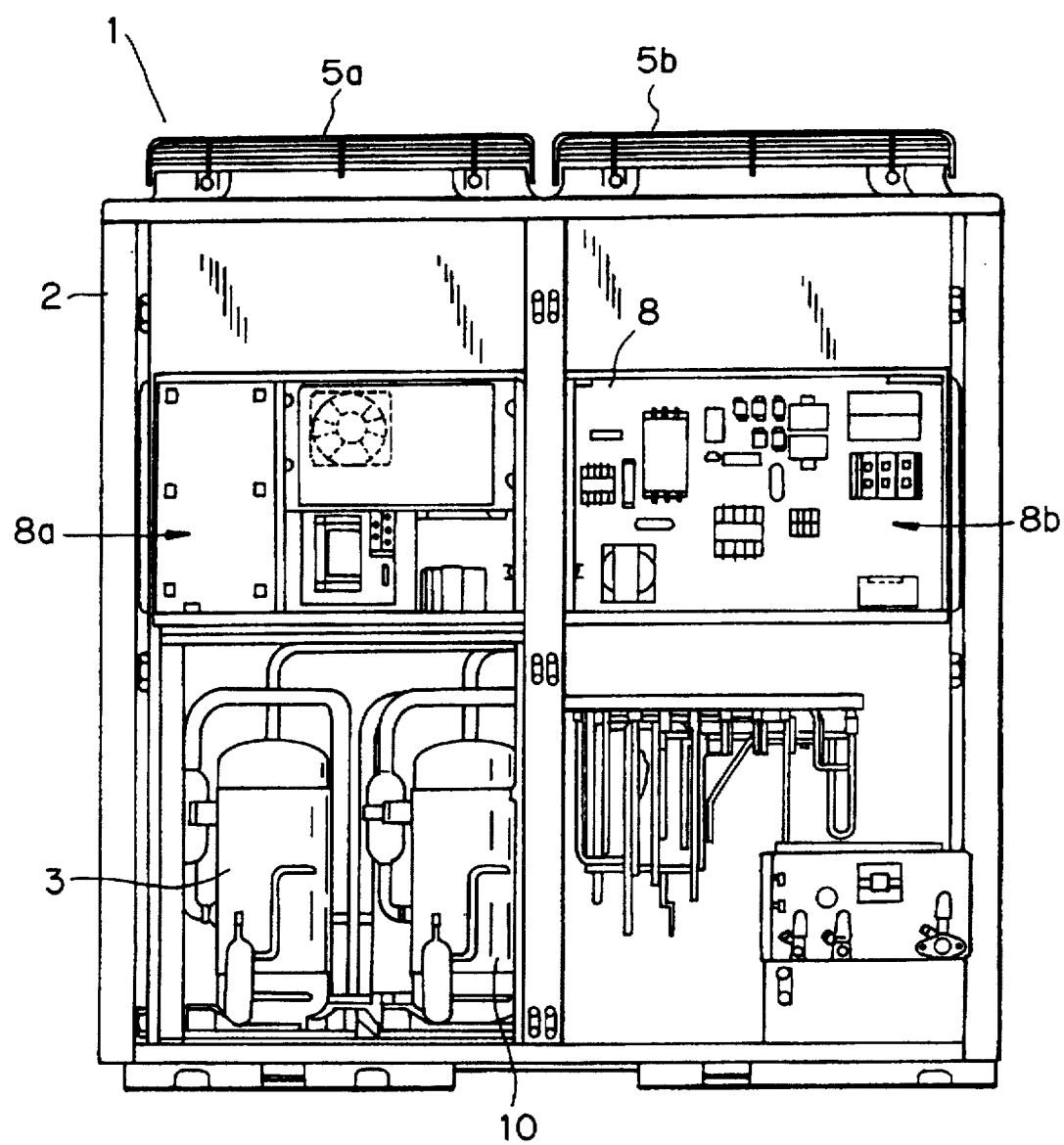
FIG. 4 is a plan view showing the inside of the conventional outdoor unit.
Figure 6:
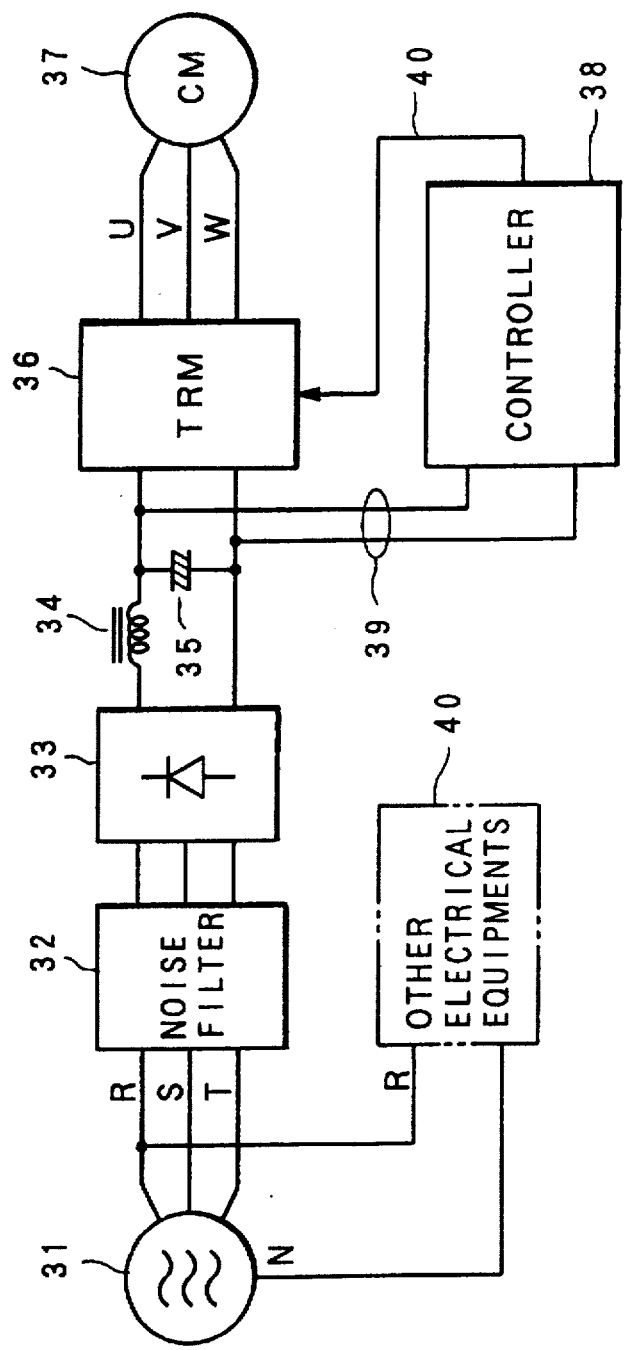
FIG. 6 is a block diagram showing the conventional inverter driving circuit and a power source for a controller.

FIG. 2 shows a second embodiment of the inverter driving circuit according to the present invention and a power source 50 for the controller. In FIG. 2, the same elements as shown in FIG. 6 are represented by the same reference numerals, and the description thereof is omitted.

In FIG. 2, the wiring arrangement of this embodiment is made so that the power-source terminal 51 of a controller 42 is supplied with alternating power applied across the neutral connection N and the R-phase of the three-phase output connections of the noise filter 32 through a power-source wiring 49.

In the controller 42, the power source terminal 51 is connected to a reactor 43, 44 and a smoothing capacitor 45. The reactor 43, 44 and the smoothing capacitor 45 constitutes a noise filter. Therefore, the noise contamination into the controller 42 is prevented doubly. Through the noise filter, the alternating power is converted to DC power by a rectifying circuit. The rectifying circuit 46 comprises a bridge rectifying circuit of diodes. The DC power is supplied to a switching regulator 47 to improve regulation, that is, stabilize the power, and then supplied to a power source of a controller main body 48. A self-oscillation type using a high-frequency transformer may be used as the switching regulator 47.

An LC smoothing circuit is preferably used at the output stage of the rectifying circuit to stabilize the power source.

According to the second embodiment as described above, the power to be supplied to the power source of the controller is taken out from the neutral point and one phase between the output stage of the noise filter and the input stage of the rectifying circuit, so that noises from the transistor module can be intercepted and the power source portion can be miniaturized because of reduction of the power source voltage.

What is claimed is:

1. An inverter driving circuit arrangement for driving a motor under variable frequency control of the type which includes:

a three-phase alternating power source having noise producing components within a first noise-containing area, an inverter having noise producing components within a second noise-containing area, a converter circuit comprising a terminal board electrically connected to said three-phase alternating power source, a first noise filter electrically connected to said terminal board to remove noise components from alternating power provided by said three-phase alternating power source, a magnet switch electrically connected to said first noise filter, a rectifier electrically connected to said magnet switch to convert the alternating power having the noise components removed therefrom to DC power, and a second noise filter electrically connected between said rectifier and said inverter to remove noise components from said inverter, said inverter including at least a transistor module for converting said DC power to AC power for driving the motor under variable frequency control, and an electrical equipment box for housing said inverter and said converter circuit, said electrical equipment box having parallel first and second sides extending in a predetermined direction and being spaced from one another, the inverter driving circuit arrangement comprising:

each of said terminal board, said magnet switch, said rectifier, and said inverter being positioned adjacent said first side of said electrical equipment box, said first noise filter and said second noise filter being positioned adjacent said second side of said electrical equipment box clear of said first and second noise-containing areas.

2. An inverter driving circuit arrangement, comprising:

a first noise filter having an input terminal electrically connected to a three-phase alternating power source having noise producing components within a first noise-containing area and an output terminal having a neutral connection and three-phase output connections, said first noise filter removing noise components from the alternating power provided by said three-phase alternating power source;

a first rectifier electrically connected to said first noise filter to convert said three-phase alternating power having said noise components removed therefrom to DC power;

an inverter having noise producing components within a second noise-containing area, said inverter being electrically connected to said first rectifier to convert said DC power to alternating power for driving a motor under variable frequency control; and a controller for controlling said inverter, said controller comprising power source terminals electrically connected across said neutral connection and one of said three-phase output connections of said first noise filter, a second noise filter electrically connected to said power source terminals for removing noise components of said inverter, a second rectifier electrically connected to said second noise filter to convert said alternating power having said noise components removed therefrom to DC power, a switching regulator electrically connected to said second rectifier to stabilize said DC power, and an inverter control unit electrically connected to said switching regulator and said inverter to control said inverter on the basis of said DC power having said noise components removed therefrom, said first and second noise filters being positioned clear of said first and second noise-containing areas.

* * * * *